US011028808B2

(12) United States Patent
Okamura et al.

(10) Patent No.: US 11,028,808 B2
(45) Date of Patent: Jun. 8, 2021

(54) INJECTOR DEVICE

(71) Applicant: HONDA MOTOR CO., LTD., Tokyo (JP)

(72) Inventors: Yuji Okamura, Wako (JP); Kazuya Mizumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 16/372,466

(22) Filed: Apr. 2, 2019

(65) Prior Publication Data

US 2019/0309711 A1    Oct. 10, 2019

(30) Foreign Application Priority Data

Apr. 4, 2018   (JP) .............................. JP2018-072537

(51) Int. Cl.
| | |
|---|---|
| *F02M 51/06* | (2006.01) |
| *F16K 7/14* | (2006.01) |
| *F16K 31/06* | (2006.01) |
| *F02M 61/10* | (2006.01) |

(52) U.S. Cl.
CPC ........ *F02M 51/0639* (2013.01); *F02M 61/10* (2013.01); *F16K 7/14* (2013.01); *F16K 31/06* (2013.01)

(58) Field of Classification Search
CPC .......... F16K 1/44; F16K 1/52; F16K 31/0624; F16K 31/0655
See application file for complete search history.

(56) References Cited

U.S. PATENT DOCUMENTS

| | | | | |
|---|---|---|---|---|
| 3,994,318 A | * | 11/1976 | Ishigaki ................ | F16K 31/404 137/630.14 |
| 5,390,703 A | * | 2/1995 | Tengesdal ................ | F16K 1/44 137/629 |
| 6,612,338 B2 | * | 9/2003 | Weldon ..................... | F16K 1/44 137/630.19 |

FOREIGN PATENT DOCUMENTS

| | | |
|---|---|---|
| JP | 09-303602 | 11/1997 |
| JP | 2010-267553 | 11/2010 |
| JP | 2011-064245 | 3/2011 |
| JP | 2012-189103 | 10/2012 |
| JP | 2014-132162 | 7/2014 |

OTHER PUBLICATIONS

Chinese Office Action for Chinese Patent Application No. 201910266022.5 dated May 20, 2020.

* cited by examiner

*Primary Examiner* — Eric Keasel
(74) *Attorney, Agent, or Firm* — Amin, Turocy & Watson, LLP (57) ABSTRACT

An injector device is equipped with a casing enabling hydrogen gas to flow in and flow out and a first plunger and a second plunger which are accommodated inside the casing. Further, by a drive unit, the injector device performs a first operation to integrally displace the first plunger and the second plunger and a second operation to displace the first plunger relative to the second plunger. The second plunger has a flow path allowing the hydrogen gas to flow, and the first plunger is disposed to be inserted into the flow path and is displaced relative to the second plunger to open and close the flow path.

8 Claims, 9 Drawing Sheets

INJECTOR DEVICE

CROSS-REFERENCE TO RELATED APPLICATION

This application is based upon and claims the benefit of priority from Japanese Patent Application No. 2018-072537 filed on Apr. 4, 2018, the contents of which are incorporated herein by reference.

BACKGROUND OF THE INVENTION

Field of the Invention

The present invention relates to an injector device for injecting a fluid.

Description of the Related Art

For example, a fuel cell system is equipped with an injector device disposed on a supply pipe for supplying hydrogen gas (fuel gas) from a fuel tank to a fuel cell stack (refer to Japanese Laid-Open Patent Publication No. 2010-267553).

The injector device disclosed in Japanese Laid-Open Patent Publication No. 2010-267553 is equipped with a housing in which a fluid (hydrogen gas) flows, a plunger (valve body) accommodated retractably in the housing, and a coil for retracting the plunger toward a first direction. This injector device injects a high-pressure fluid from the housing by making the fluid flow from the supply pipe on the upstream side of the housing together with the retraction of the plunger. Further, the injector device blocks the injection of the fluid together with the advance of the plunger.

SUMMARY OF THE INVENTION

It can be said that the aforementioned injector device is of the configuration to inject the fluid under a so-called simple opening and closing control that designs the injection of the fluid as ON (opening) and the injection stop of the fluid as OFF (closing). The injector device of this kind is advantageous in a point of being capable of instantaneously injecting the fluid at a large flow rate. On the other hand, the injector device also has a disadvantage of being difficult in regulating the pressure of the fluid relative to the fluid existing in the supply pipe on the downstream side (i.e., in making the fluid flow at a low flow rate).

In order to regulate the pressure of the fluid, it may be conceived to install, in addition to the injector device, a regulator for reducing the working pressure of the fluid. However, in the case of employing another configuration like this, such another configuration may result in enlarging the scale of the device as well as in increasing the cost.

The present invention has been made in view of the foregoing circumstances, and it is an object of the present invention to provide an injector device capable of realizing the downsizing and the cost reduction of the device and being excellent in usability by enabling the fluid to be injected at a large flow rate and also by enabling the fluid to flow out at a small flow rate.

In order to accomplish the aforementioned object, an injector device according to the present invention comprises a casing enabling a fluid to flow in and flow out, a first plunger and a second plunger accommodated inside the casing, and a drive unit capable of performing a first operation to integrally displace the first plunger and the second plunger and a second operation to displace the first plunger relative to the second plunger, wherein the second plunger has a flow path along which the fluid flows and wherein the first plunger is inserted into the flow path and is displaceable relative to the second plunger to open and close the flow path.

In this case, it is preferable that the first plunger and the second plunger have a regulation mechanism for the fluid and that the regulation mechanism linearly regulates a working flow rate of the fluid based on a displacement amount of the first plunger relative to the second plunger in the second operation.

Further, it is preferable that the regulation mechanism includes a valve portion provided at an end portion of the first plunger and an accommodation portion forming the flow path in the second plunger and accommodating the valve portion to be switchable into and out of contact with the valve portion.

Furthermore, it is preferable that the casing be provided with a fluid chamber enabling the fluid to flow in and that the second plunger be disposed only in the fluid chamber.

In addition to the foregoing configuration, it is preferable that the second plunger be configured to form between the second plunger and the casing a flow route which makes the fluid flow in a space defined by the first and second plungers before operation.

Then, the drive unit may include a first coil unit for integrally displacing the first plunger and the second plunger toward a first direction in the first operation and a second coil unit for displacing the first plunger toward a second direction opposite to the first direction in the second operation.

In this case, it is preferable that the first coil unit and the second coil unit be arranged along the axial direction of the casing and be configured to apply driving forces to the first plunger.

Further, it is preferable that the drive unit further include a first spring urging the second plunger to move toward the second direction in the first operation and a second spring urging the first plunger to move toward the first direction in the second operation.

Alternatively, the drive unit may include one coil unit, and the coil unit may be configured to perform the second operation which makes the fluid to flow at a minute flow rate, by displacing the first plunger a first moving amount toward a predetermined direction and to perform the first operation which makes the fluid to flow at a large flow rate, by displacing the first plunger a second moving amount larger than the first moving amount toward the predetermined direction.

Furthermore, the drive unit may be configured to further include a first spring urging the first plunger to move toward an opposite direction to the predetermined direction and a second spring urging the second plunger to move toward the opposite direction.

According to the present invention, the injector device is able to perform the first operation to integrally displace the first plunger and the second plunger and the second operation to displace the first plunger relative to the second plunger. Therefore, it is possible to make the fluid flow at different flow rates. Therefore, for example, it is possible for the injector device to inject the fluid at a large flow rate by performing the first operation and also to make the fluid flow at a smaller flow rate than that in the first operation by performing the second operation. Consequently, the injector device is able to freely set the working pressure and the working flow rate of the fluid and that is low in cost and excellent in usability. In addition, because the injector device has the first plunger inserted into the flow path of the second plunger to open and close the flow path, it is possible to realize the downsizing of the injector device even equipped with two plungers.

The above and other objects, features, and advantages of the present invention will become more apparent from the following description when taken in conjunction with the accompanying drawings, in which preferred embodiments of the present invention are shown by way of illustrative examples.

DESCRIPTION OF THE PREFERRED EMBODIMENTS

With reference to the accompanying drawings, the present invention will be described in detail based on preferred embodiments.

First Embodiment

Figure 1:
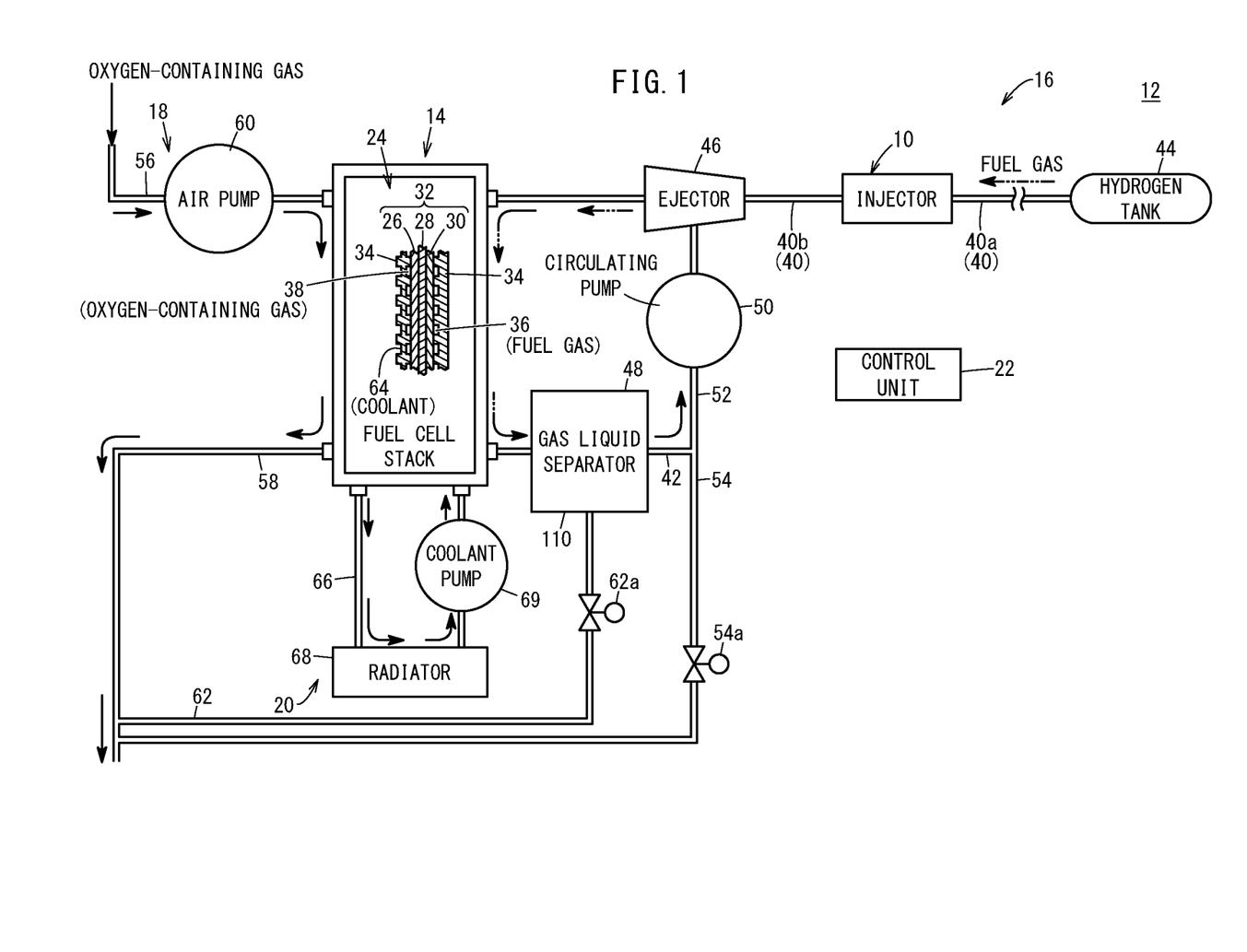
FIG. 1 is an explanatory illustration showing the overall configuration of a fuel cell system to which an injector device according to a first embodiment of the present invention is applied.

As shown in FIG. 1, an injector device 10 according to a first embodiment of the present invention is applied to a fuel cell system 12. The fuel cell system 12 has a fuel cell stack 14 (hereafter referred to as FC stack 14) for performing power generation, and the injector device 10 is provided for supplying a hydrogen gas (fuel gas) to the FC stack 14. The injector device 10 makes the hydrogen gas flow at a suitable working flow rate and a suitable working pressure.

In the following description, for the convenience of explanation, first the fuel cell system 12 to which the injector device 10 is applied will be described. The fuel cell system 12 is equipped with a fuel gas supply device 16 for supplying the hydrogen gas to the FC stack 14, an oxygen-containing gas supply device 18 for supplying air (oxygen-containing gas) to the FC stack 14, a cooling device 20 for circulating a coolant with respect to the FC stack 14, and a control unit 22 for controlling the operations of various devices. This fuel cell system 12 is mounted on, for example, a fuel cell vehicle and supplies electric power to an electric system within the vehicle. Incidentally, the object to which the fuel cell system is applied is not limited particularly and may be configured for a stationary use.

The FC stack 14 is formed by stacking a plurality of fuel cells 24 inside a casing. The fuel cell 24 has a membrane electrode assembly 32 formed by stacking a cathode 26, a solid polymer electrolyte membrane 28 and an anode 30, and also has flow fields for a hydrogen gas and an air by sandwiching the membrane electrode assembly 32 between separators 34. Then, an anode flow field 36 is supplied with a hydrogen gas from the fuel gas supply device 16, while a cathode flow field 38 is supplied with an air from the oxygen-containing gas supply device 18. The hydrogen gas flowing through the anode flow field 36 and oxygen in the air flowing through the cathode flow field 38 react in the membrane electrode assembly 32, so that electric power or electric power is generated.

The fuel gas supply device 16 has a fuel gas supply pipe 40 communicating with the anode flow field 36 for supplying hydrogen gas and a fuel gas discharge pipe 42 communicating with the anode flow field 36 for discharging anode off-gas. The fuel gas supply pipe 40 has on its upstream side a hydrogen tank 44 storing high-pressure hydrogen. Then, the aforementioned injector device 10 and an ejector 46 are provided on the fuel gas supply pipe 40 between the FC stack 14 and the hydrogen tank 44.

The fuel gas discharge pipe 42 is provided with a gas-liquid separator 48, and the gas-liquid separator 48 separates the gas (hydrogen gas) and the liquid (water) which are contained in the anode off-gas. The fuel gas discharge pipe 42 is connected to a hydrogen circulating pipe 52 having a circulating pump 50 for circulation of hydrogen as well as to an exhaust pipe 54. The hydrogen circulating pipe 52 is connected to the ejector 46, so that the ejector 46 draws the hydrogen in the hydrogen circulating pipe 52 based on the flow rate of the hydrogen gas from the injector device 10. The exhaust pipe 54 is provided on itself with a purge valve 54a and exhausts the anode off-gas when the purge valve 54a is opened.

On the other hand, the oxygen-containing gas supply device 18 has an oxygen-containing gas supply pipe 56 communicating with the cathode flow field 38 for supplying air and an oxygen-containing gas discharge pipe 58 communicating with the cathode flow field 38 for discharging the cathode off-gas. The oxygen-containing gas supply pipe 56 is provided with an air pump 60, and the air pump 60 controls the flow rate of air to be supplied to the FC stack 14 under the control of the control unit 22. Further, the oxygen-containing gas discharge pipe 58 is connected to a drainage pipe 62 for draining the water separated at the gas-liquid separator 48 and is also connected to the exhaust pipe 54. The drainage pipe 62 is provided with a drain valve 62a for opening and closing a passage inside its pipe. The oxygen-containing gas discharge pipe 58 discharges the anode off-gas and the water together with the cathode off-gas outside the system.

The cooling device 20 is equipped with a coolant circulating pipe 66 communicating with a coolant flow path 64 which is provided between the adjoining separators 34 of the FC stack 14. The coolant circulating pipe 66 has a radiator 68 and a coolant pump 69 disposed thereon. By controlling the driving speed of the coolant pump 69, the control unit 22 controls the flow rate of the coolant which circulates through the coolant circulating pipe 66 and the FC stack 14.

Figure 2:
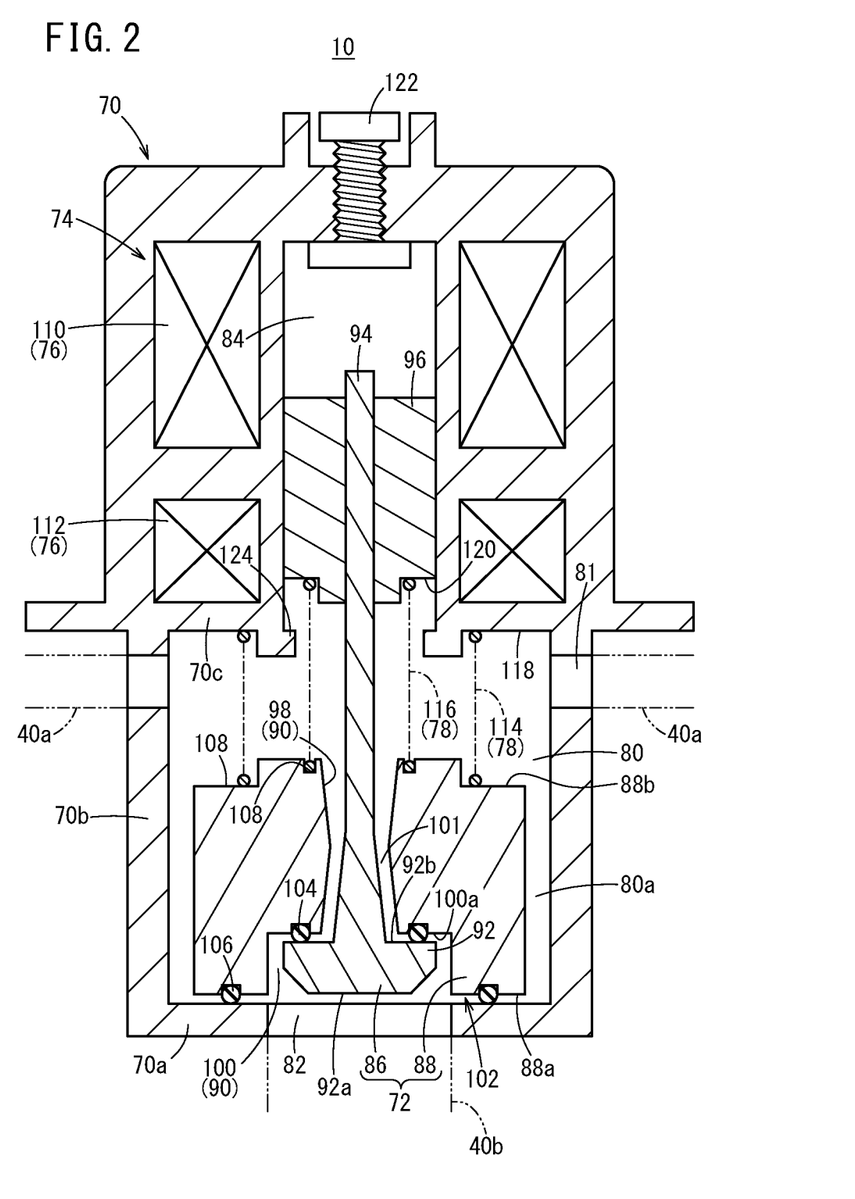
FIG. 2 is a longitudinal sectional view showing the injector device according to the first embodiment.

Next, the injector device 10 applied to the fuel gas supply device 16 of the aforementioned fuel cell system 12 will be described with reference to FIG. 2.

The injector device 10 is formed in a cylindrical shape and has a casing 70 enabling a hydrogen gas (fluid) to flow in and flow out. Inside the casing 70, plungers 72 are displaceably accommodated, and a drive unit 74 for driving the plungers 72 is provided. The drive unit 74 includes coil units 76 and springs 78.

The casing 70 is equipped with a fluid chamber 80 having a predetermined volume and is also equipped with gas flow inlets 81 and a gas flow outlet 82 all in communication with the fluid chamber 80. The fluid chamber 80 is provided on an end side of the casing 70 and movably accommodates portions of the plungers 72. Further, the fluid chamber 80 is in communication with a drive chamber 84 in which another portion of the plungers 72 is disposed.

The gas flow inlets 81 are provided on a lateral surface of the casing 70 (i.e., at a place orthogonal to the axial direction of the plunger 72). The gas flow inlets 81 are connected to an upstream side supply pipe 40a which, of the fuel gas supply pipe 40, is connected to the hydrogen tank 44, and enable the hydrogen gas to flow in the fluid chamber 80 (also refer to FIG. 1). The gas flow outlet 82 is provided at a position facing the plungers 72 in the axial direction. The gas flow outlet 82 is connected to a downstream side supply pipe 40b which, of the fuel gas supply pipe 40, is connected to the ejector 46, and enables the hydrogen gas in the fluid chamber 80 to flow out. An end wall portion 70a of the casing 70 surrounding the gas flow outlet 82 forms a seat portion on which the end portion of one of the plungers 72 is seated.

The plungers 72 have a first plunger 86 to which a driving force is transmitted from the coil units 76, and a second plunger 88 configured as a member separated from the first plunger 86.

The first plunger 86 is disposed to be inserted into a flow path 90 of the second plunger 88 and is configured to be engaged with an end side of the second plunger 88. The first plunger 86 is capable of performing a first operation to integrally move the second plunger 88 toward a base end direction (first direction), and a second operation to advance toward an end direction (second direction) relative to the second plunger 88. The first plunger 86 has a valve portion 92 disposed on the end side, a shaft portion 94 connected to the valve portion 92 and a magnetic body 96 secured to the base end side of the shaft portion 94.

The valve portion 92 is formed in a disc-like shape and is disposed to face a gas flow outlet 82 at its end surface 92a. Further, the valve portion 92 is disposed within an accommodation recess 100 of the second plunger 88 and is fluid-tightly in contact with the second plunger 88 at its base end surface 92b in a usual state that the driving force is not being applied from the drive unit 74. Then, the shaft portion 94 is connected to a center portion of the base end surface 92b of the valve portion 92.

The shaft portion 94 extends over a predetermined length in the axial direction of the casing 70 to be disposed in both of the fluid chamber 80 and the drive chamber 84. The shaft portion 94 disposed within the fluid chamber 80 extends through the second plunger 88.

The magnetic body 96 is rigidly fixed to an outer peripheral surface of the shaft portion 94 and moves the first plunger 86 back and forth in the axial direction of the casing 70 when given a magnetic force transmitted from the coil units 76.

On the other hand, the second plunger 88 is a movable body disposed in the fluid chamber 80 and is formed lager in radial outward direction than the valve body 92 of the first plunger 86. The outer peripheral surface of the second plunger 88 defines a gap 80a of a suitable passage cross-section area (which is larger than a passage cross-section area between the outer peripheral surface of the shaft portion 94 of the first plunger 86 and the inner peripheral surface of the second plunger 88) between itself and a sidewall portion 70b of the casing 70.

The second plunger 88 has the flow path 90 at its axial center portion (center portion). The flow path 90 has a through hole 98 allowing the shaft portion 94 of the first plunger 86 to extend through and the accommodation recess 100 (accommodation portion) communicating with the through hole 98 and provided at the end portion of the second plunger 88. The accommodation recess 100 opens on an end surface 88a of the second plunger 88 and faces the gas flow outlet 82. The accommodation recess 100 accommodates the valve portion 92 of the first plunger 86. A bottom surface 100a of the accommodation recess 100 is in communication with the through hole 98. Further, the accommodation recess 100 cooperates with the valve portion 92 to define a gap 101 whose passage cross-section area varies linearly with the displacement of the valve portion 92.

That is, the injector device 10 forms a regulation mechanism 102 capable of regulating the working flaw rate of the hydrogen gas by the cooperation between the valve portion 92 and the accommodation recess 100. The regulation mechanism 102 regulates the working flow rate of the hydrogen gas in accordance with the size of the gap 101 and the position of the valve portion 92 in or out of contact with the bottom surface 100a so that the working flow rate of the hydrogen gas is linearly increased in proportion to an increase in a displacement amount of the first plunger 86 relative to the second plunger 88.

The second plunger 88 is provided on the bottom surface 100a of the accommodation recess 100 with a first seal 104 to be brought into contact with the valve portion 92 of the first plunger 86, and is also provided on the end surface 88a with a second seal 106 to be brought into contact with the end wall portion 70a of the casing 70. The first seal 104 fluid-tightly blocks the flow path 90 in a contact state with the valve portion 92 of the first plunger 86. Likewise, in a contact state with the casing 70, the second seal 106 fluid-tightly blocks a place (flow route) at which the hydrogen gas in the fluid chamber 80 flows. Incidentally, the first and second seals 104, 106 may be provided on the first plunger 86 side and the chasing 70 side, respectively.

The second plunger 88 is provided at its base end surface 88b with second-plunger-side spring seats 108 on which the springs 78 are respectively disposed. As will be described later, the springs 78 include two springs (a first spring 114 and a second spring 116), in correspondence to which the second plunger 88 is provided with two spring seats 108.

The coil units 76 of the injector device 10 are provided on the base end side of the casing 70 and surround the lateral side of the drive chamber 84. The coil units 76 are provided in the form of two units (a first coil unit 110 and a second coil unit 112) separated in the axial direction of the casing 70. That is, the first coil unit 110 is provided on the base end side of the casing 70, and the second coil unit 112 is provided at a position which is on the end side beyond the first coil unit 110 and which is spaced a predetermined interval from the first coil unit 110.

The first and second coil units 110, 112 are formed of winding conductive metal wires, and generate magnetic fields attracting the magnetic body 96 of the first plunger 86 under the control of the control unit 22. In particular, the first coil unit 110 is able to generate a strong magnetic field because of the larger number of windings than the second coil unit 112, and the magnetic force of the first coil unit 110 causes the first plunger 86 to be moved together with the second plunger 88 toward the base end direction. On the other hand, the second coil unit 112 causes, by its magnetic force, the first plunger 86 to be moved relative to the second plunger 88 toward the end direction.

Further, as mentioned above, the springs 78 are provided as two springs. That is, the first spring 114 is disposed between a bottom wall portion 70c of the casing 70 forming the fluid chamber 80 and the base end surface 88b of the second plunger 88. The second spring 116 is disposed between the end surface of the magnetic body 96 of the first plunger 86 and the base end surface 88b of the second plunger 88. For this purpose, the casing 70 is formed with a casing-side spring seat 118 at the bottom wall portion 70c, while the magnetic body 96 is provided at its end surface with a first-plunger-side spring seat 120.

The first spring 114 urges the second plunger 88 to move away from the bottom wall portion 70c of the casing 70 (i.e., toward the end direction). The second spring 116 urges the magnetic body 96 of the first plunger 86 to move away from the base end surface 88b of the second plunger 88 (i.e., toward the base end direction). The urging force of the first spring 114 is set larger than that of the second spring 116.

Furthermore, the casing 70 of the injector device 10 is equipped with a stroke adjusting mechanism 122 for adjusting the retraction amount of the first plunger 86 and a protrusion 124 setting an advance limit of the first plunger 86. By adjusting the retraction amount of the first plunger 86 by the stroke adjusting mechanism 122, it is possible to regulate the flow rate of the hydrogen gas which is injected at the time of a first operation.

The injector device 10 according to the first embodiment is basically configured as described above, and the operation will be described hereunder.

The injector device 10 is applied to the fuel gas supply device 16 in the fuel cell system 12 and supplies the hydrogen gas in the hydrogen tank 44 to the ejector 46 at a suitable working flow rate and a suitable working pressure when the driving is controlled by the control unit 22. Specifically, the power supply is switched by the control unit 22 selectively to the first and second coil units 110, 112, so that the injector device 10 performs two operations (i.e., the first operation and the second operation).

Figure 3:
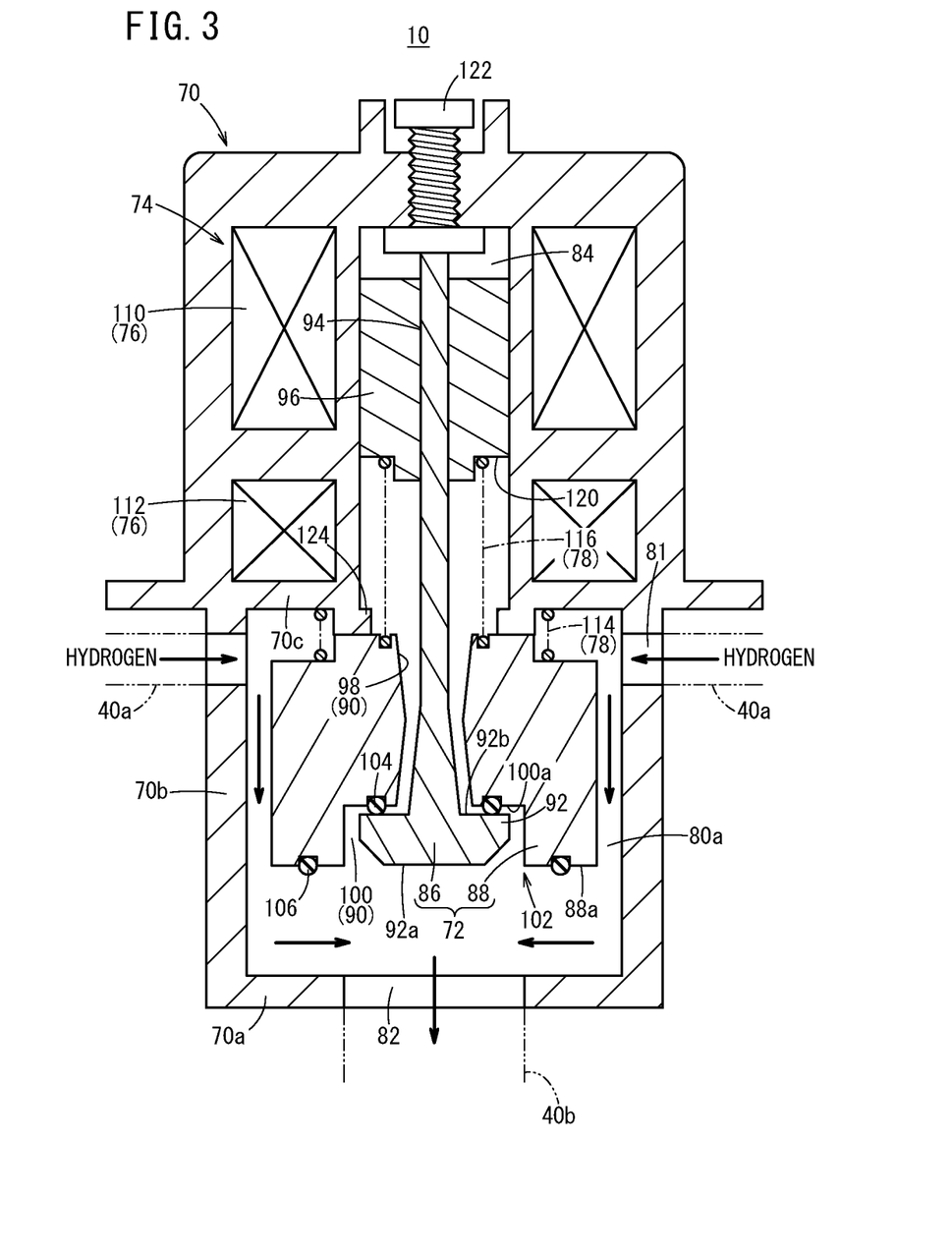
FIG. 3 is a longitudinal sectional view showing a first operation state of the injector device shown in FIG. 2.

That is, in the first operation, as shown in FIG. 3, the control unit 22 supplies electric power to the first coil unit 110 to generate a magnetic force from the first coil unit 110. Thus, the magnetic body 96 of the first plunger 86 is attracted toward the first coil unit 110, whereby the entire of the first plunger 86 is retracted toward the base end direction. When retracted, the first plunger 86 is hooked on the second plunger 88 at the valve portion 92 on the end side and transmits the retraction force of the first plunger 86 to the second plunger 88. Therefore, the first coil unit 110 integrally moves the first and second plungers 86, 88 toward the base end direction against the urging force of the first spring 114.

The movements of the first and second plungers 86, 88 toward the base end direction result in opening a place (the second seal 106) which has been closed until then by the end surface 88a of the second plunger 88 and the end wall portion 70a of the casing 70. Thus, in the fluid chamber 80, the gas flow inlets 81 are brought into communication with the gas flow outlet 82. That is, the hydrogen gas supplied from the upstream side supply pipe 40a flows in the fluid chamber 80 through the gas flow inlets 81. This hydrogen gas advances to the end side of the casing 70 through a flow route extending through the gap 80a between the sidewall portion 70b of the casing 70 and the outer peripheral surface of the second plunger 88 in the fluid chamber 80. Furthermore, the hydrogen gas flows through a space between the end wall portion 70a of the casing 70 and the end surface 88a of the second plunger 88 to advance the center portion (the place facing the first plunger 86), so that the hydrogen gas is injected from the casing 70 into the downstream side supply pipe 40b.

The movements of the first and second plungers 86, 88 toward the base end direction are performed until the first plunger 86 is brought into abutment on the stroke adjusting mechanism 122 (the movement limit) in the casing 70. Then, when the control unit 22 discontinues supplying electric power to the first coil unit 110, the magnetic body 96 stops generation of the attraction force, whereby the plungers 72 are moved toward the end direction by the elastic restoring force of the first spring 114. In short, the second plunger 88 is moved toward the end direction by receiving the urging force of the first spring 114, and the valve portion 92 (the first plunger 86) engaged with the second plunger 88 is moved together toward the end direction.

Thereafter, the plungers 72 block the injection of the hydrogen gas when the second plunger 88 are moved toward the end direction to contact with the end wall portion 70a of the casing 70. As described above, in the injector device 10, it is possible to supply the hydrogen gas at a large flow rate to the downstream side supply pipe 40b in the first operation in which the first plunger 86 and the second plunger 88 are integrally moved back and forth.

Figure 4:
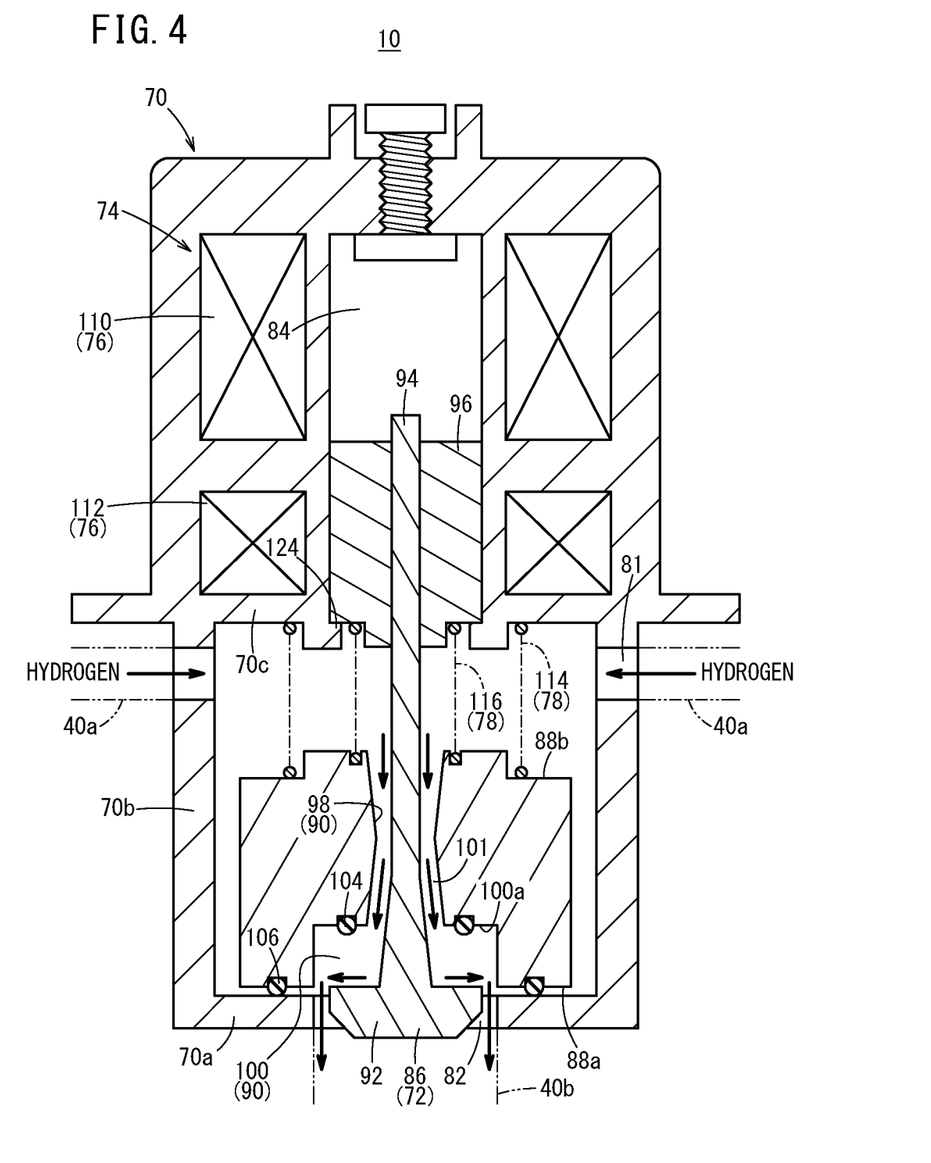
FIG. 4 is a longitudinal sectional view showing a second operation state of the injector device shown in FIG. 2.

On the other hand, in the second operation, as shown in FIG. 4, the control unit 22 supplies electric power to the second coil unit 112 so that the second coil unit 112 generates a magnetic force. Thus, the magnetic body 96 is attracted toward the second coil unit 112, and the first plunger 86 is displaced toward the end direction against the urging force of the second spring 116.

Therefore, the valve portion 92 and the accommodation recess 100 forming the regulation mechanism 102 cause the base end surface 92b to separate from the bottom surface 100a to open the place which has been blocked by the first seal 104. This opening amount is smaller than the amount by which the second plunger 88 opens relative to the casing 70 in the first operation. Further, the regulation mechanism 102 increases its opening amount in proportion linearly to the displaced amount of the valve portion 92 (i.e., the separation amount from the bottom surface 100a). Therefore, the hydrogen gas flows through the flow route defined between the outer peripheral surface of the shaft portion 94 and the inner peripheral surface of the through hole 98 of the second plunger 88, and the gap 101 between the valve portion 92 and the accommodation recess 100. Thus, the hydrogen gas flows toward the end side of the casing 70 at a flow rate which is adjusted to be smaller than that in the first operation.

That is, in the second operation, it is possible to make the hydrogen gas flow gradually from between the first plunger 86 and the second plunger 88. Further, when the control unit 22 stops supplying electric power to the second coil unit 112, the magnetic body 96 stops generating the attraction force, whereby the first plunger 86 is moved toward the base end direction by the elastic restoring force of the second spring 116. This results in closing the opening portion between the first plunger 86 and the second plunger 88.

Figure 5A:
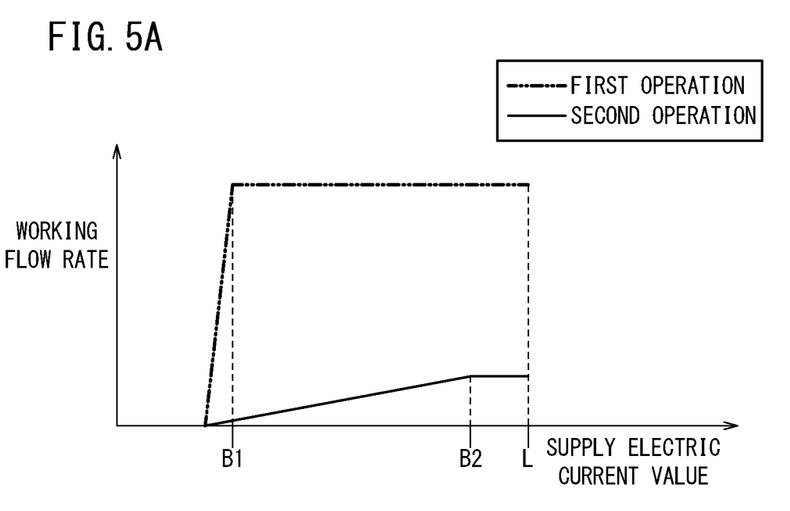
FIG. 5A is a graph showing working flow rate characteristics of the injector device shown in FIG. 2.

The aforementioned first and second operations of the injector device 10 can be summarized as the working flow rate characteristics of the hydrogen gas shown in FIG. 5A. That is, in the first operation, as electric current is supplied to the first coil unit 110 under the control of the control unit 22, the working flow rate abruptly rises up to a first boundary value B1 in proportion to the supplied electric current value. That is, in the first operation, the working flow rate largely rises in a short period of time. Then, when the supplied current value increases higher than the first boundary value B1, the working flow rate becomes constant at a high value. Accordingly, by the execution of the first operation, it is possible for the control unit 22 to make the hydrogen gas injected at a large flow rate.

Further, also in the second operation, the working flow rate linearly rises in proportion to the supplied electric current at a stage that the supplied electric current value to the second coil unit 112 is smaller than a second boundary value B2. Because this second boundary value B2 is set to, for example, a value higher than the first boundary value B1 and because the opening amount in the second operation is small as mentioned above, the working flow rate rises gently. Incidentally, when the supplied electric current becomes the second boundary value B2 or higher, the plunger 72 (i.e., the first plunger 86) advances to the advance limit (i.e., the abutment position on the protrusion 124), so that the working flow rate becomes constant at a lower value than that in the first operation.

Particularly, because the second operation is performed together with the operation which circulates the hydrogen gas in the fuel gas supply device 16, it is possible to regulate the flow rate of the hydrogen gas more precisely by making the working flow rate rise gently and linearly up to the second boundary value B2. For example, by controlling the supplied electric current value in response to the circulation pressure of the hydrogen gas on the downstream side, the displacement amount of the valve portion 92 is adjusted, so that it is possible to regulate the working flow rate and the working pressure of the hydrogen gas. In short, it is possible to operate the injector device 10 as a regulator for controlling the working pressure of the hydrogen gas to a constant pressure.

Figure 5B:
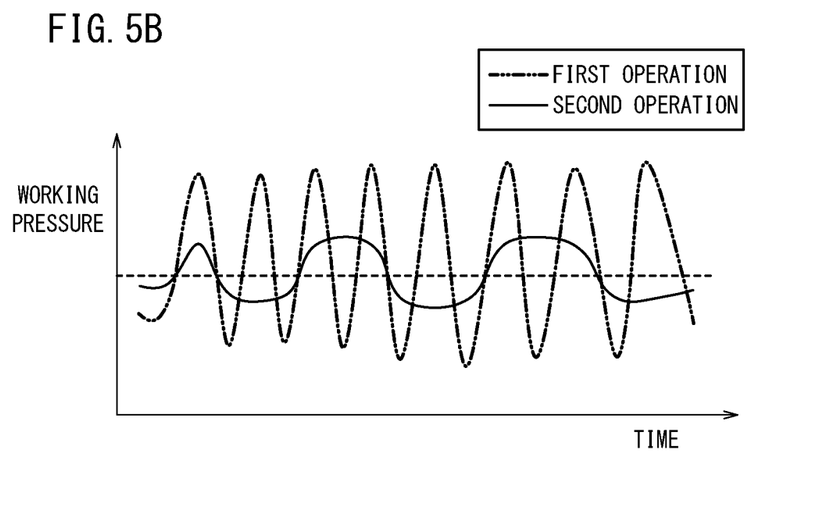
FIG. 5B is a graph showing working pressure characteristics of the injector device shown in FIG. 2.

Further, as shown in FIG. 5B, the working pressure on the downstream side of the injector device 10 fluctuates up and down with a large amplitude in the first operation, but fluctuates up and down with a small amplitude in the second operation. Accordingly, it is possible for the control unit 22 to suitably regulate the pressure of the hydrogen gas on the downstream side of the injector device 10 by combining the first operation and the second operation. For example, the control unit 22 restrains the pulsation of the piping system by executing the first operation in the case where the fuel cell vehicle (or the fuel cell system 12) generates a large sound or the second operation in the case where the vehicle generates a small sound. Therefore, it is possible to reduce the noise of the injector device 10 which can be heard by the user in a situation that the sound generated from the vehicle is small.

The injector device 10 configured as described above according to the first embodiment demonstrates the following advantages and effects.

The injector device 10 is capable of executing the first operation which integrally displaces the first plunger 86 and the second plunger 88 and the second operation which displaces the first plunger 86 relative to the second plunger 88 and thus, is able to make the hydrogen gas flow at different flow rates. That is, the injector device 10 injects the fluid at a large flow rate by performing the first operation and makes the fluid flow at a smaller flow rate than that in the first operation by performing the second operation. Therefore, the injector device 10 makes it possible to more freely set the working pressure and the working flow rate of the fluid and thus is more excellent in usability. In addition, the injector device 10 is of the configuration that the first plunger 86 opens and closes the flow path 90 of the second plunger 88 by being inserted into the flow path 90. With this arrangement, it is possible to realize downsizing of the injector device 10 even with the two plungers 72.

Further, the injector device 10 is able to satisfactorily regulate the pressure of the hydrogen gas to flow toward the downstream side by linearly adjusting the working flow rate of the hydrogen gas by the regulation mechanism 102 based on the displacement amount of the first plunger 86 relative to the second plunger 88. For example, in the case where the pressure of the hydrogen gas existing on the downstream side is temporarily high, it becomes possible to lessen the amount of the hydrogen gas flowing through the flow path 90 by decreasing the displacement amount of the first plunger 86, and hence to reduce the pressure on the downstream side.

In addition to the foregoing configuration, the injector device 10 is capable of simply forming the regulation mechanism 102 by the valve portion 92 of the first plunger 86 and the accommodation portion of the second plunger 88. Particularly, in designing the regulation mechanism 102, it is possible to easily design the flow rate of the hydrogen gas at the time of the second operation based on the dimensions of the valve portion 92 and the accommodation portion.

Furthermore, in the injector device 10, because the displacement of the first plunger 86 by the drive unit 74 is able to effect the displacement of the second plunger 88 disposed in the fluid chamber 80, it becomes possible to control the flow of the hydrogen gas through a simple driving control. In addition, since the coil units 76 do not directly apply the driving force to the second plunger 88, it is possible to simplify the configuration of the device and to further facilitate the downsizing.

Still further, in the injector device 10, together with the integral retraction of the first and second plungers 86, 88 in the execution of the first operation, it is possible to inject the hydrogen gas at a larger flow rate through the fluid route between the second plunger 88 and the casing 70.

Then, in the injector device 10, because the first and second coil units 110, 112 are provided, it is possible to easily switch the displacement direction of the first plunger 86 toward the base end direction or toward the end direction by supplying electric power selectively to either of the first and second coil units 110, 112. Therefore, it becomes possible to make the flow rate control of the hydrogen gas easier.

In this case, in the injector device 10, since the first coil unit 110 and the second coil unit 112 are arranged in the axial direction of the casing 70, it is possible to make the radial dimension of the casing 70 smaller significantly, and hence it becomes possible to apply the injector device 10 to various kinds of devices.

Further, in the injector device 10, by the provision of the springs 78, it is possible to smoothly realize respective elastic restorations of the first and second plungers 86, 88, and thus it becomes possible, for example, to increase the working pressure of fluid at the time of an injection.

Obviously, the present invention is not particularly limited to the foregoing embodiment and may be variously modified without departing from the gist of the invention.

For example, the injector device 10 is not limited to the application to the fuel cell system 12 and may be applicable to various systems that perform the injection of fluid and the flow rate control.

Second Embodiment

Figure 6:
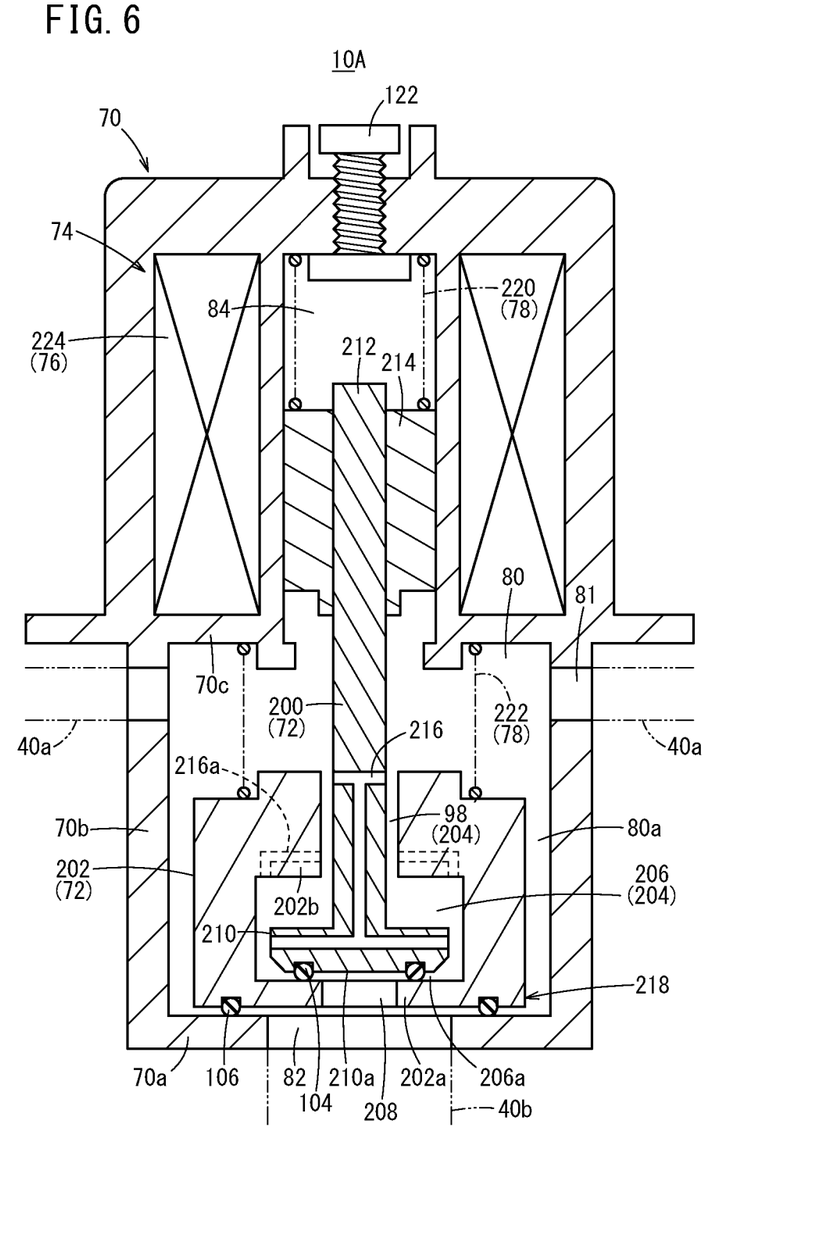
FIG. 6 is a longitudinal sectional view showing an injector device according to a second embodiment of the present invention.

As shown in FIG. 6, an injector device 10A according to a second embodiment likewise has two plungers 72 but differs from the injector device 10 according to the first embodiment in that only one coil unit 76 is used. Incidentally, in the following description, components which have the same configurations and the same functions as those in the foregoing first embodiment are given the same reference numerals and detailed explanations thereof will be omitted.

Specifically, a flow path 204 in a second plunger 202 has a through hole 98 and an accommodation chamber 206 (accommodation portion) accommodating a valve portion 210 of a first plunger 200 inside. This accommodation chamber 206 is in communication with the through hole 98 of the second plunger 202 and is also in communication with an opening 208 formed in an end wall portion 202a of the second plunger 202. The opening 208 faces the gas flow outlet 82 and is formed smaller in diameter than the gas flow outlet 82. Furthermore, the second seal 106 capable of making a fluid-tight sealing in contact with the end wall portion 70a of the casing 70 is secured the end wall portion 202a of the second plunger 202.

As in the first embodiment, the first plunger 200 accommodated in the second plunger 202 is basically composed of the valve portion 210, a shaft portion 212 and a magnetic body 214. A flow passage 216 enabling the hydrogen gas to flow therethrough is provided inside the valve portion 210 and the shaft portion 212. The flow passage 216 extends from the outer peripheral surface of the shaft portion 212 through the inside of the same toward the end direction, is bent inside the valve portion 210 to extend radially outward and opens on the outside surface of the valve portion 210.

The valve portion 210 is accommodated movably through a fixed moving allowance distance between the end wall portion 202a and a bottom wall portion 202b of the second plunger 202 forming the opening 208. The valve portion 210 protrudes radially outward beyond the through hole 98 and the opening 208 and is therefore configured to be stopped by being hooked on the end wall portion 202a and the bottom wall portion 202b. At its end surface 210a, the valve portion 210 secures the first seal 104 which is capable of performing a fluid-tight sealing in contact with the end wall portion 202a of the second plunger 202.

A regulation mechanism 218 of the first and second plungers 200, 202 is composed of the accommodation chamber 206 and the valve portion 210. That is, although being block with the valve portion 210 held in contact with the end wall portion 202a of the accommodation chamber 206, the flow of the hydrogen gas through the flow path 204 is allowed when the valve portion 210 is moved toward the base end direction (the predetermined direction). Further, when the valve portion 210 is moved through the moving allowance distance, the regulation mechanism 218 increases a gap 206a between the valve portion 210 and the accommodation chamber 206 gradually. Therefore, the opening amount linearly increases with an increase in the displacement amount of the valve portion 210, so that it is possible to linearly vary the flow rate of the hydrogen gas (also refer to FIG. 9A).

The injector device 10A has two springs 78 in correspondence to the foregoing configuration of the plungers 72. A first spring 220 is disposed between a base end surface of the magnetic body 214 on the first plunger 200 and the casing 70 and urges the first plunger 200 toward the end direction (the opposite direction). A second spring 222 is disposed between the base end surface of the second plunger 202 and the bottom wall portion 70c of the casing 70 and urges the second plunger 202 toward the end direction. Then, the urging force of the second spring 222 is set to be larger than that of the first spring 220.

On the other hand, the single coil unit 224 (coil unit 76) provided in the injector device 10A is supplied with suitable electric power under the control of the control unit 22 (refer to FIG. 1) to attract the magnetic body 214 of the first plunger 200. Thus, the first plunger 200 is given a retraction force to be retracted toward the base end direction.

The injector device 10A according to the second embodiment is basically configured as described above, and the operation will be described hereafter.

Figure 7:
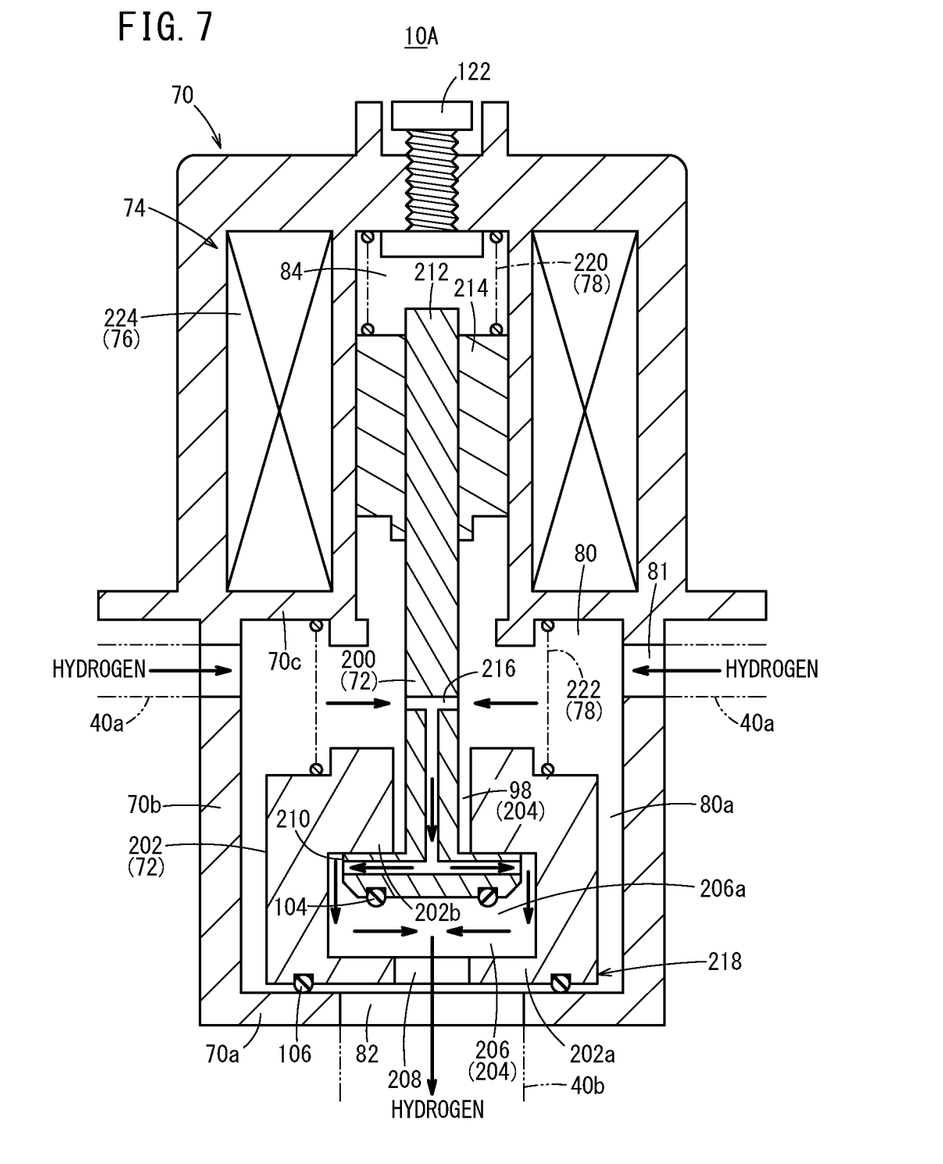
FIG. 7 is a longitudinal sectional view showing the injector device shown in FIG. 6 which is at a first retraction stage.

When the single coil unit 224 is supplied with electric power under the control of the control unit 22, the injector device 10A causes the single coil unit 224 to generate a magnetic force. Thus, as shown in FIG. 7, the magnetic body 214 of the first plunger 200 is attracted to perform a first retraction stage (corresponding to the second operation in the foregoing first embodiment) at which the entire of the first plunger 200 is displaced through a first moving amount toward the base end direction against the urging force of the first spring 220. At the first retraction stage, the first plunger 200 is retracted alone (relative to the second plunger 202) until the valve portion 210 is brought into abutment on the bottom wall portion 202b of the second plunger 202.

Thus, owing to the retraction movement of the first plunger 200, the valve portion 210 opens the place which has been blocked by the first seal 104 in the accommodation chamber 206. As a result, the hydrogen gas flowing from the upstream side supply pipe 40a through the gas flow inlets 81 into the fluid chamber 80 follows a flow route to flow in the flow passage 216 in the first plunger 200. The hydrogen gas flows in the accommodation chamber 206 through the flow passage 216 and moves toward the opening 208 through a gap 206a between the accommodation chamber 206 and the valve portion 210. Thus, the hydrogen gas flows out from the opening 208 and further flows out from the gas flow outlet 82 of the casing 70 into the downstream side supply pipe 40b. Accordingly, at the first retraction stage of the first plunger 200, the injector device 10A is able to make the hydrogen gas flow out at a small and regulated working flow rate.

Figure 8:
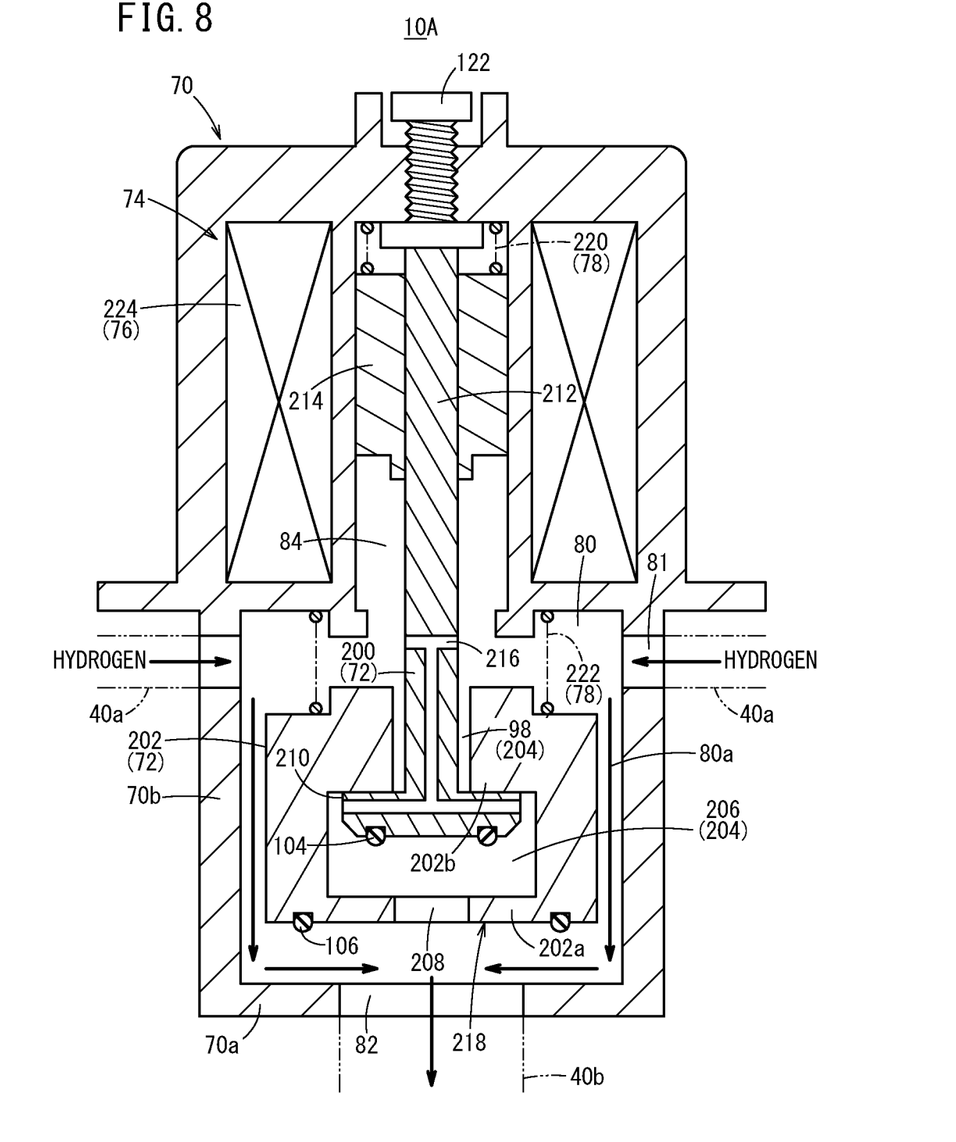
FIG. 8 is a longitudinal sectional view showing the injector device shown in FIG. 6 which is at a second retraction stage.

After the first retraction stage, it is possible for the coil portion 76 to perform a second retraction stage (corresponding to the first operation in the foregoing first embodiment) at which the first plunger 200 is further displaced through a second displacement amount toward the base end direction. As shown in FIG. 8, at the second retraction stage, the valve portion 210 of the first plunger 200 being retracted is hooked on the second plunger 202 to give a retraction force also to the second plunger 202. Thus, the second plunger 202 is retracted against the urging force of the second spring 222 to open the place which has been closed by the second seal 106 in the fluid chamber 80.

As a consequence, the hydrogen gas flowing from the upstream side supply pipe 40a through the gas flow inlets 81 into the fluid chamber 80 flows to the end side of the casing 70 along the flow route which extends through the gap 80a between the sidewall portion 70b of the casing 70 and the outer peripheral surface of the second plunger 202 in the fluid chamber 80. Further, the hydrogen gas flows between the end wall portion 70a of the casing 70 and the end wall portion 202a of the second plunger 202 toward the center portion (the place facing the first plunger 200). Thus, it is possible to inject the hydrogen gas from the gas flow outlet 82 to the downstream side supply pipe 40b.

The movements of the first and second plungers 200, 202 toward the base end direction is performed until the first plunger 200 is brought into abutment on the stroke adjusting mechanism 122 (movement limit) of the casing 70. Subsequently, when the control unit 22 discontinues supplying electric power to the single coil unit 224, the first and second plungers 200, 202 are moved toward the end direction by the elastic restoring forces of the springs 78. Then, when the movements toward the end direction bring the second plunger 202 into contact with the end wall portion 70a of the casing 70 and, at the same time, the valve portion 210 of the first plunger 200 into contact with the end wall portion 202a of the second plunger 202, the injection of the hydrogen gas is blocked.

Figure 9A:
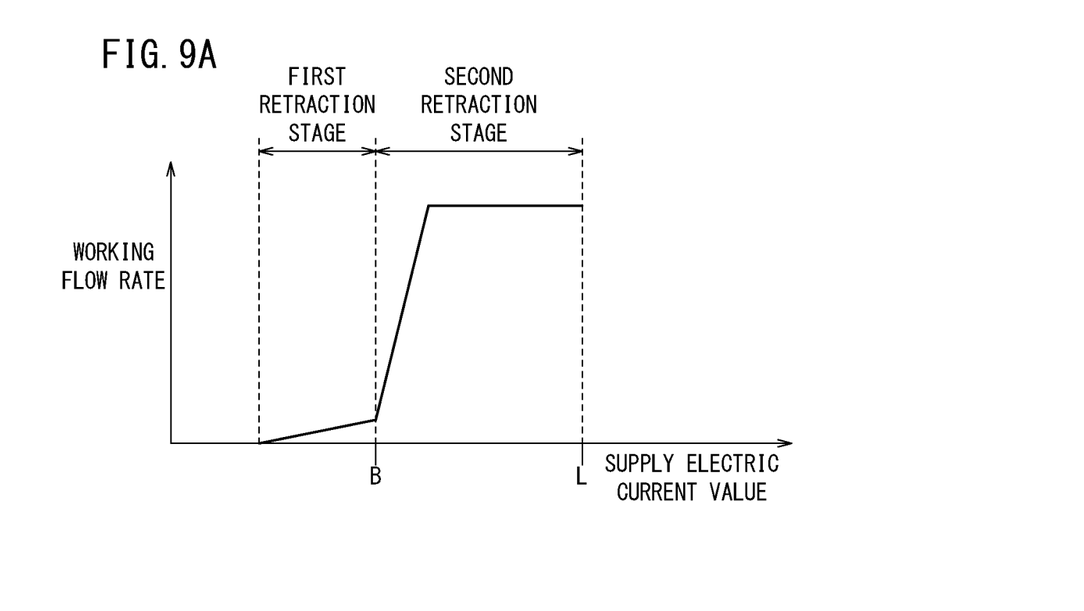
FIG. 9A is a graph showing working flow rate characteristics of the injector device shown in FIG. 6.

The aforementioned operation of the injector device 10A can be summarized as the working flow rate characteristics of the hydrogen gas shown in FIG. 9A. That is, at the first retraction stage, the single coil unit 224 is supplied with electric current under the control of the control unit 22, and at the stage that the supplied electric current value is smaller than a boundary value B, the regulating mechanism 218 of the first plunger 200 and the second plunger 202 opens, whereby the working flow rate linearly rises in proportion to the supplied electric current value. Then, when the supplied electric current value becomes the boundary value B or higher, the first and second plungers 200, 202 are integrally retracted to increase the working flow rate abruptly. Then, when the supplied electric current becomes a supply limit value L, it is possible to inject the hydrogen gas at a large flow rate.

Figure 9B:
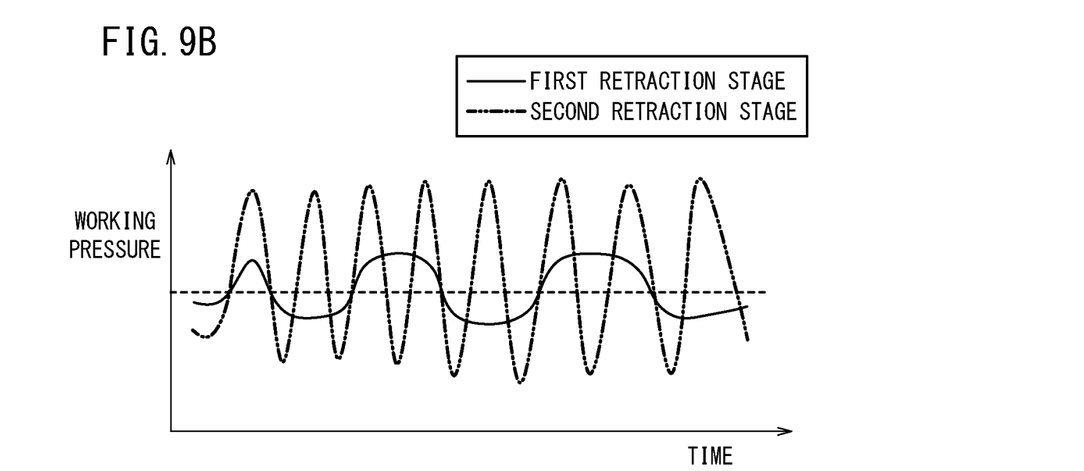
FIG. 9B is a graph showing working pressure characteristics of the injector device shown in FIG. 6.

Further, it can be said that as shown in FIG. 9B, the working pressure on the downstream side of the injector device 10A fluctuates up and down with a small amplitude at the first retraction stage, but fluctuates up and down with a large amplitude at the second retraction stage. Accordingly, it is possible for the control unit 22 to suitably regulate the pressure of the hydrogen gas on the downstream side of the injector device 10A by combining the first retraction stage and the second retraction stage.

As having been described hereinabove, even in the injector device 10A according to the second embodiment, it is possible to achieve the same effects as those of the injector device 10 according to the first embodiment. In particular, even in the configuration that the first and second operations are performed by the single coil unit 224, the injector device 10A makes it possible to further simplify the flow rate control of the fluid with ease. Additionally, because of the single coil unit 224, it is possible to facilitate the downsizing of the injector device 10A.

Further, with the first and second springs 220, 222, it is possible in the injector device 10A to smoothly realize the elastic restorations of the first and second plungers 200, 202 even after the first plunger 200 is displaced toward the same direction at the first and second operations.

Obviously, the injector device 10A according to the second embodiment may also take various application examples and modifications without being limited to the foregoing configuration. For example, the aforementioned injector device 10A is configured to provide the flow passage 216 in the first plunger 200. The place at which the flow passage 216 is formed is not limited to this place. For example, there may be provided a flow passage 216a in the second plunger 202 (refer to the broken line in FIG. 6). That is, the flow passage 216a is in communication with the inner peripheral surface surrounding the through hole 98 and the accommodation chamber 206, and an opening of the flow passage 216a on the accommodation chamber 206 side faces the gap between the outer peripheral surface of the valve portion 210 and the sidewall of the second plunger 202. Even in this modified case, it is possible to satisfactorily lead the hydrogen gas to the accommodation chamber 206.

What is claimed is:

1. An injector device comprising:
a casing enabling fluid to flow in and flow out;
a first plunger and a second plunger accommodated inside the casing; and
a drive unit configured to cause the first plunger and the second plunger to displace, wherein the drive unit comprises:
a coil unit arranged along an axial direction of the casing and configured to apply a driving force to the first plunger, and
a spring configured to urge the first plunger to move toward an opposite direction to a predetermined direction;
the first plunger and the second plunger are configured to integrally displace in a first operation of the drive unit, and the first plunger is configured to displace relative to the second plunger in a second operation of the drive unit;
the second plunger has a flow path along which the fluid flows;
the first plunger is inserted into the flow path and is displaceable relative to the second plunger to open and close the flow path; and
the first plunger internally includes a flow passage communicating with the flow path of the second plunger to guide the fluid having flowed in the casing to the flow path, wherein the flow path is continuously open.

2. The injector device according to claim 1, wherein the first plunger and the second plunger have a regulation mechanism for the fluid; and
the regulation mechanism configured to linearly change an opening amount of the flow path based on a displacement amount of the first plunger relative to the second plunger in the second operation.

3. The injector device according to claim 2, wherein the regulation mechanism includes:
a valve portion provided at an end portion of the first plunger; and
an accommodation portion forming the flow path in the second plunger and accommodating the valve portion to be switchable in and out of contact with the valve portion.

4. The injector device according to claim 1, wherein the casing is provided with a fluid chamber enabling the fluid to flow in; and
the second plunger is disposed only in the fluid chamber.

5. The injector device according to claim 4, wherein in the first operation, the second plunger defines with the casing a flow route which makes the fluid flow into a space formed before the first and second plungers are moved.

6. The injector device according to claim 1, wherein:
the drive unit includes one coil unit; and
the coil unit is configured:
to perform the second operation, by displacing the first plunger a first moving amount toward the predetermined direction; and to perform the first operation, by displacing the first plunger a second moving amount larger than the first moving amount toward the predetermined direction; and a flow rate at which the second moving amount allows the fluid to flow is larger than a flow rate at which the first moving amount allows the fluid to flow.

7. The injector device according to claim 6, wherein the spring is a first spring, and wherein the drive unit further includes:

a second spring that urges the second plunger to move toward the opposite direction.

8. The injector device according to claim 1, further comprising a controller, wherein the controller is configured to control the drive unit to perform the first operation when a volume of sounds around the injector device is greater than a threshold value, and perform the second operation when a volume of sounds around the injector device is smaller than the threshold value.

* * * * *